United States Patent [19]
Strack

[11] 3,879,182
[45] Apr. 22, 1975

[54] METHOD OF MAKING MINATURE PRISMS
[75] Inventor: Richard R. Strack, Southbridge, Mass.
[73] Assignee: American Optical Corporation, Southbridge, Mass.
[22] Filed: Feb. 4, 1974
[21] Appl. No.: 438,989

[52] U.S. Cl. ............................. 65/37; 65/39; 65/54; 65/61; 65/102; 65/DIG. 7; 350/286
[51] Int. Cl.. C03b 11/08; C03c 19/00; C03b 23/00
[58] Field of Search .......... 65/DIG. 7, 4, 38, 39, 61, 65/54, 37, 102; 350/286

[56] References Cited
UNITED STATES PATENTS

| | | | |
|---|---|---|---|
| 3,397,022 | 8/1968 | Cole | 65/4 X |
| 3,455,667 | 7/1969 | Snitzer et al. | 65/38 X |
| 3,505,046 | 4/1970 | Phaneuf | 65/38 X |
| 3,712,705 | 1/1973 | Marcatilli | 65/DIG. 7 |
| 3,831,466 | 8/1974 | Hicks, Jr. | 65/31 X |

*Primary Examiner*—Robert L. Lindsay, Jr.
*Assistant Examiner*—Frank W. Miga
*Attorney, Agent, or Firm*—H. R. Berkenstock, Jr.; W. C. Nealon

[57] ABSTRACT

Manufacturing miniature plural element wavelength multiplexing prisms by preparing an accurately proportioned greatly oversized preform of each element of the respective prisms and assembling the preforms in side-by-side relationship as a boule, heating and drawing the boule longitudinally into an elongated component of greatly reduced cross-sectional size and cutting the drawn component transversely into a plurality of short sections each of a length equal to that desired of the prism resulting from such cutting.

10 Claims, 5 Drawing Figures ns.
METHOD OF MINATURE PRISMS

BACKGROUND OF THE INVENTION

1. Field of the Invention

The manufacture of light-refracting optical components with particular reference to the fabrication of miniature plural element wavelength multiplexing prisms.

2. Description of the Prior Art

Heretofore, plural element prisms were produced one at a time with considerable skill and effort being required for tediously separately precision grinding and polishing each element of each prism and cementing the elements in properly oriented and/or aligned relationship with each other. While these operations were ordinarily painstaking and costly, they further become an undertaking not always possible to accomplish with predictable or acceptable end result when dealing with miniature multiplexing prisms such as those used in fiber optic image enhancing systems. The latter prisms have overall outer dimensions typically in the order of from 2 to 4 millimeters square and are formed of two or more, preferably three elements. Exceptional problems are encountered in the grinding, polishing, assembling, cementing and even handling of such miniaturized optical elements.

A principal object of the present invention is to provide a simplified method for making miniature plural element prisms of improved quality with a minimal expenditure of time and effort and without the requirement for unusual skills or equipment. The method is adaptable to large or small quantity production.

SUMMARY OF THE INVENTION

The aforementioned objective and its corollaries are accomplished according to the present invention by first preparing an accurately proportioned but greatly oversized preform of each element of a miniature wavelength multiplexing prism intended to be produced. The surfaces of the preforms which correspond to the desired light-refracting surfaces of the miniature prism are precision ground and polished to an optical finish with conventional apparatus and techniques, the use of which is made possible by the large size of the preforms.

The ground and polished preforms are assembled in a geometrical side-by-side relationship corresponding to that desired of the miniature prism and clamped or otherwise held fixedly thereinplace as a boule. The boule is then heated adjacent one of its ends and drawn longitudinally to a greatly reduced cross-sectional size which corresponds to the size desired of the miniature prism. The resulting fused component, now having an overall cross-sectional width and thickness dimension corresponding to that desired of the miniature prism is cut transversely at two points along its length which are spaced a distance apart equal to the third dimension desired of the prism thereby producing the miniature prism. Successive similar transverse cuts through the drawn component may be made to produce additional similar prisms.

Details of the invention will be better understood by reference to the following description when taken in conjunction with the accompanying drawings.

IN THE DRAWINGS

DESCRIPTION OF THE PREFERRED EMBODIMENTS

Figure 1:
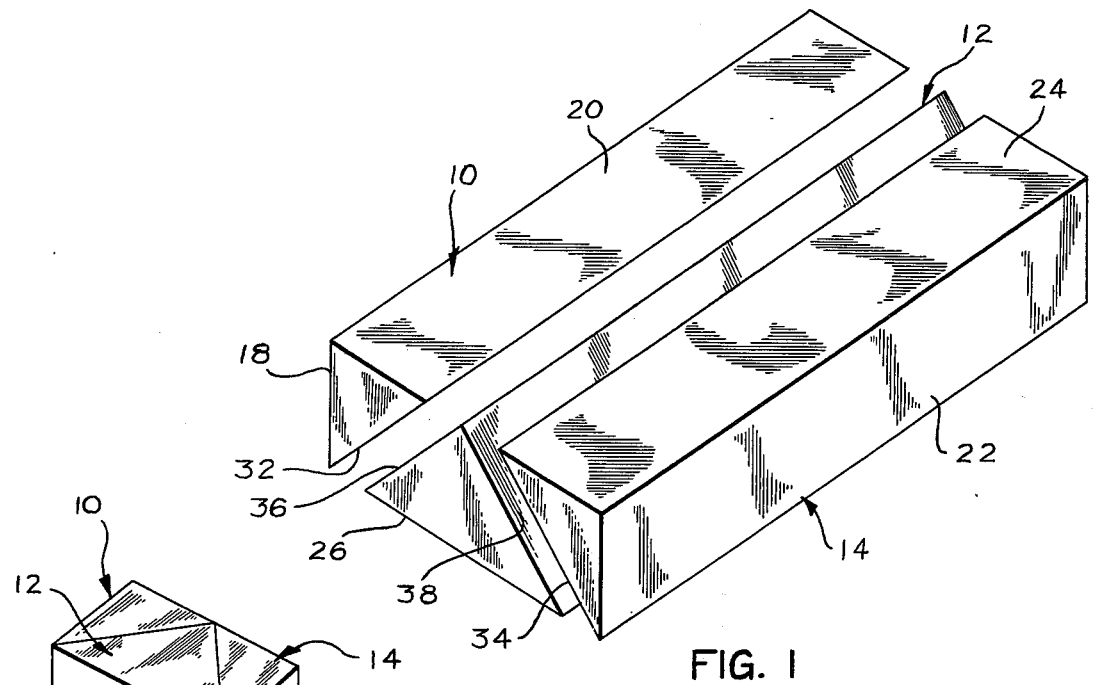
FIG. 1 is an illustration, in exploded fashion, of a plurality of preforms used to make up the structure of a plural element prism according to one aspect of the invention.
Figure 2:
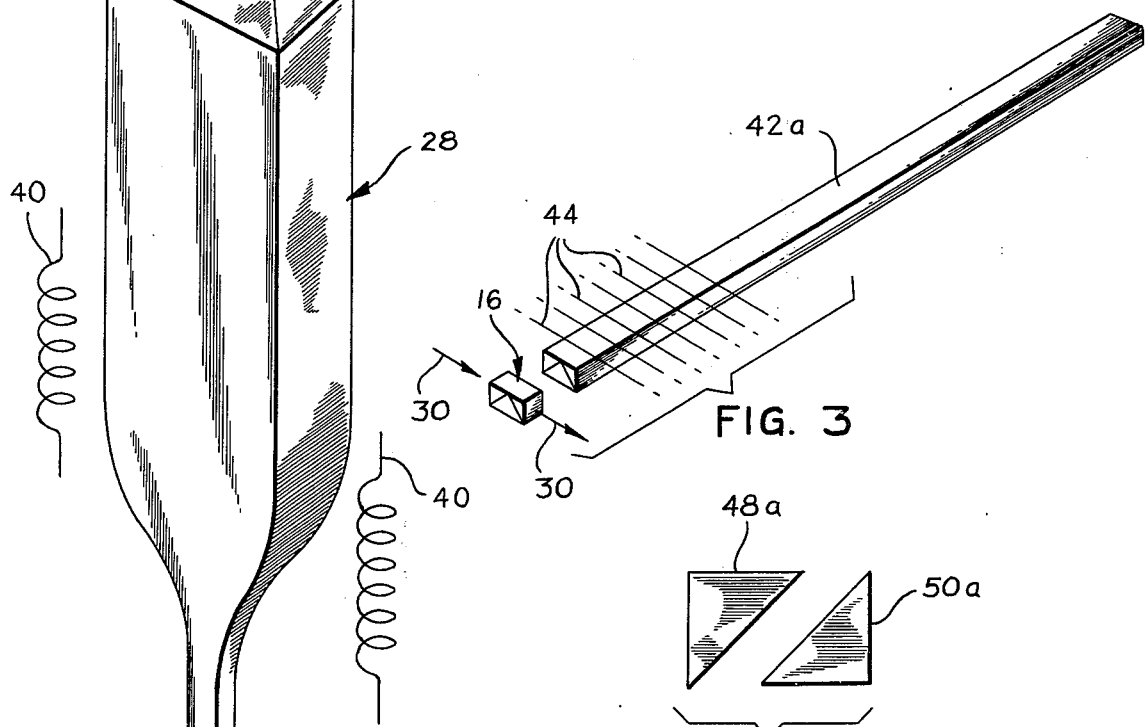
FIG. 2 is an illustration, in perspective, of an assembly of the preforms shown in FIG. 1 having a portion of its length drawn longitudinally to a greatly reduced cross-sectional size.
Figure 3:
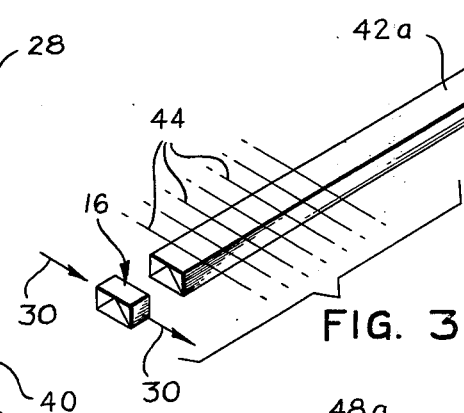
FIG. 3 is a view, in perspective, of a section of the drawn portion of the assembly shown in FIG. 2 wherein a step of cutting miniature prisms therefrom is diagrammatically illustrated.

With particular reference to FIGS. 1-3, it can be seen that miniature multiple element prisms are produced according to the present invention by preparing an accurately proportioned but greatly oversized preform of each element of the prism.

Exemplary prism preforms 10, 12 and 14 are illustrated in FIG. 1. These preforms are of such cross-sectional shapes that when assembled tightly together in side-by-side relationship they will produce the geometrical configuration of a typical three-element multiplexing prism. Their individual sizes being many times greater than corresponding dimensions desired of the elements of a prism to be formed therefrom render the assembly similarly larger than the finished prism. For example, a multiplicity of finished prisms of 4 millimeters wide, 2 millimeters high and 2 millimeters in thickness may be formed from an assembly of preforms 10, 12 and 14 which measures 30 millimeters wide, 15 millimeters high and 50 centimeters long. By providing preforms 10 and 14 with sides 18, 20 and 22, 24 respectively which are each 15 millimeters wide and providing preform 12 with a side 26 which is 30 millimeters wide, the aforesaid cross-sectional dimension of the assembly of preforms, i.e., boule 28 (FIG. 2), may be arrived at.

In a preferred embodiment of the invention wherein it may be desirable to direct light through a finished prism 16 (FIG. 3) in the direction of arrows 30, i.e., for wavelength multiplexing, preforms 10 and 14 may each be constructed of a lanthanum crown glass having an index of refraction $n_d$ for a wavelength of 5,876 Angstroms equaling 1.73350, an index of refraction $n_F$ for a wavelength of 4,861 Angstroms equaling 1.74340, an index of refraction $n_C$ for a wavelength of 6,563 Angstroms equaling 1.72920 and a dispersion $[(R_d - 1)/(n_F - n_C)]$ equaling 51.65.

Preform 12 accordingly would be formed of a glass having a coefficient of expansion and melting temperature which, in each case, is compatible for fusing to and drawing with the aforementioned lanthanum crown glass. This latter glass may be a short flint glass having an index of refraction $n_d$ for 5,876 Angstroms equaling 1.72825, an index of refraction $n_F$ for 4,861 Angstroms equaling 1.74648, an index of refraction $n_C$ for 6,563 Angstroms equaling 1.72085, and a dispersion $[(n_d - 1)/(n_F - n_C)]$ equaling 28.41.

Lanthanum crown and short flint glasses having the aforementioned characteristics are commercially identified as LaK 16 and SF 10 respectively by Schott Optical Glass, Inc., York Avenue, Duryea, Pa.; currently a supplier thereof.

Since a finished prism 16 (FIG. 3) will normally receive and emit light in the direction of arrows 30 when used as a wavelength multiplexer, surfaces 18 and 32 of preform 10 as well as surfaces 22 and 34 of preform 14, and surfaces 36 and 38 of preform 12 are all ground and polished to optical perfection prior to the formation of boule 28.

The relatively large sizes of preforms 10, 12 and 14 permit easy handling thereof and, accordingly, the grinding and polishing of such surfaces and/or others of the preform may be accomplished with the convenience, ease and economy of ordinary flat glass grinding and polishing apparatus. Such apparatus in their various forms are familiar to those skilled in the art. In their simplest form, they include a flat cast-iron disc which is rotated about its axis and against which the surface of a glass preform to be optically ground and polished may be lightly pressed while an abrasive or polishing slurry is applied thereto.

Following the grinding and polishing of preforms 10, 12 and 14 and assembling thereof in intimate side-by-side relationship as boule 28 (FIG. 2), one end of boule 28 is zone heated with suitable heating means, e.g., electrical coils 40. This portion of the boule is brought to a temperature of, for example, approximately 1,250°F rendering it suitably viscous for drawing. Optimum drawing temperatures for the lanthanum crown and flint glasses described hereinabove may range from 1,250° to 1,275°F. The boule is then drawn longitudinally to a reduced cross-sectional size which corresponds to the width and height dimensions desired of prism 16. A 7.5 to 1 ratio of size reduction of the 15 by 30 mm boule 28 will yield the aforementioned exemplary 2 by 4 mm size of prism 16.

A length 42a of the drawn portion 42 of boule 28 is removed from the boule and cut transaxially along a first of lines 44 (FIG. 3) to form prism 16. Any desired additional number of similar prisms may be produced by cutting along other lines 44. The space between lines 44 determines the thickness dimension of prisms, their width and height dimensions having been established by the sizing of preforms 10, 12 and 14 and control of the drawing ratio used to form portion 42 of boule 28.

Figure 5:
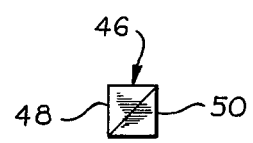
FIG. 5 is an end view of a prism produced from the preforms of FIG. 4.

A modified form of wavelength multiplexing prism is illustrated in FIG. 5 wherein the prism 46 is comprised of only two triangular light-refracting components 48 and 50.

Figure 4:
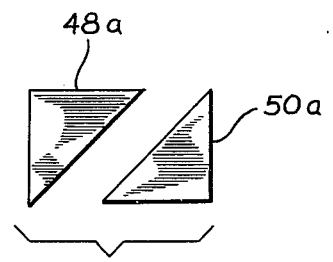
FIG. 4 is an end view of a pair of prism preforms of a type useful in the manufacture of a modified wavelength multiplexing prism according to the invention.

According to the invention, a prism such as prism 46 may be produced from preforms such as 48a and 50a (FIG. 4) each of which are ground, polished and assembled in side-by-side relationship with each other. The assembly is then drawn and cut transaxially into the prisms.

It is to be understood that any or all preforms 10, 12, 14, 48a or 50a may, before grinding and polishing, be roughly preshaped by casting, drawing, sawing or pressing from stock glass. Also, in preparing the assembly of preforms 10, 12 and 14 for drawing, i.e., as boule 28, and/or the assembly of preforms 48a and 50a (FIG. 4) for similar drawing, the respective preforms may be fixedly held in place by mechanical clamps or bindings or they may be lightly prefused together.

Those skilled in the art will readily appreciate that various modifications and adaptations of the precise form of the invention here shown and described may be made to suit particular requirements. It is, accordingly, intended that all modifications which incorporate the disclosed novel concept of forming miniature multiple element prisms are to be construed as coming within the scope of the following claims or the range of equivalency of to which they are entitled in view of the prior art.

It is further pointed out that those interested in details of the utility and function of miniature multiple element wavelength multiplexing prisms may refer to the *Journal of the Optical Society of America*, 56:1453 (1966) and/or U.S. Pat. No. 3,449,037.

I claim:

1. The method of making a wavelength multiplexing prism comprised of a plurality of glass elements having flat light-refracting faces fused together in a prearranged geometrically patterned interfacial relationship for controllably dispersing light passing in one direction therethrough, said method comprising the steps of:
   constructing from stock glasses an oversized preform of each element of the prism to be produced, said preforms having surfaces which correspond in shape to those of said light-refracting faces desired of said prism;
   grinding and polishing said surfaces of said preforms;
   assembling the preforms with said ground and polished surfaces thereof tightly juxtapositioned in a geometrically patterned relationship which corresponds to the geometrical patterning desired of said faces in said prism;
   heating one end of the assembly of said preforms to a temperature suitable for fusing said surfaces of said preforms together and for drawing said assembly;
   drawing the assembly as a unit in a direction longitudinally of said juxtapositioned surfaces of said preforms into a section of reduced cross-sectional size to fuse said surfaces together as said light-refracting faces of said prism; and
   transaxially cutting from said drawn section of said assembly a short portion of its length; said portion comprising said prism.

2. The method according to claim 1 wherein additional prisms may be produced by repeating the step of transaxially cutting said drawn section of said assembly a preselected number of times according to the number of prisms desired to be produced.

3. The method according to claim 1 wherein said preforms are three in number, each of a triangular cross-sectional configuration.

4. The method according to claim 3 wherein said geometrically patterned relationship of said ground and polished surfaces of said preforms in said assembly thereof includes the arrangement of one of said surfaces of each of two of said preforms being positioned against two adjoining surfaces of a third of said preforms.

5. The method according to claim 1 wherein said preforms are two in number.

6. The method according to claim 5 wherein said preforms are triangular in cross-sectional shape and said surfaces which correspond in shape to light-refracting faces desired of said prism include two sides of each of said triangular preforms, one side of one preform being positioned against one side of the other preform in the formation of said assembly.

7. The method according to claim 1 including the step of fusing said preforms together in said juxtapositioned geometrically patterned relationship prior to said steps of heating and drawing.

8. The method according to claim 4 wherein additional prisms may be produced by repeating the step of transaxially cutting said drawn section of said assembly a preselected additional number of times according to the number of prisms desired to be produced.

9. The method according to claim 6 wherein additional prisms may be produced by repeating the step of transaxially cutting said drawn section of said assembly a preselected additional number of times according to the number of prisms desired to be produced.

10. The method according to claim 1 wherein at least one of said preforms is comprised of a glass having substantially different refractive index and light dispersion properties than the refractive index and light dispersion properties of the remaining preform(s).

* * * * *